United States Patent [19]
Garofalakis et al.

[11] Patent Number: 5,845,279
[45] Date of Patent: Dec. 1, 1998

[54] SCHEDULING RESOURCES FOR CONTINUOUS MEDIA DATABASES

[75] Inventors: Minos N. Garofalakis, Madison, Wis.; Banu Özden; Abraham Silberschatz, both of Summit, N.J.

[73] Assignee: Lucent Technologies Inc., Murray Hill, Del.

[21] Appl. No.: 883,993

[22] Filed: Jun. 27, 1997

[51] Int. Cl.[6] .................................................. G06F 17/30
[52] U.S. Cl. .................................................. 707/7; 348/7
[58] Field of Search ....................................... 707/7; 348/7

[56] References Cited

U.S. PATENT DOCUMENTS

| | | | |
|---|---|---|---|
| 5,361,262 | 11/1994 | Cheung | 370/440 |
| 5,521,630 | 5/1996 | Chen et al. | 348/7 |
| 5,537,534 | 7/1996 | Voight et al. | 395/182.04 |
| 5,712,976 | 1/1998 | Falcon, Jr. et al. | 395/200.49 |
| 5,721,956 | 2/1998 | Martin et al. | 395/872 |

*Primary Examiner*—Paul R. Lintz
*Assistant Examiner*—Ella A. Colbert

[57] ABSTRACT

Various systems and methods of scheduling media segments of varying display rate, length and/or periodicity on at least one clustered, vertically-striped or horizontally-striped continuous media database volume. With respect to the at least one horizontally-striped database volume, one method includes the steps of: (1) associating a display value with each of the media segments, (2) sorting the media segments in a non-increasing order of value density to obtain an ordered list thereof and (3) building a scheduling tree of the media segments, the scheduling tree having a structure that increases a total display value of the media segments.

39 Claims, 11 Drawing Sheets

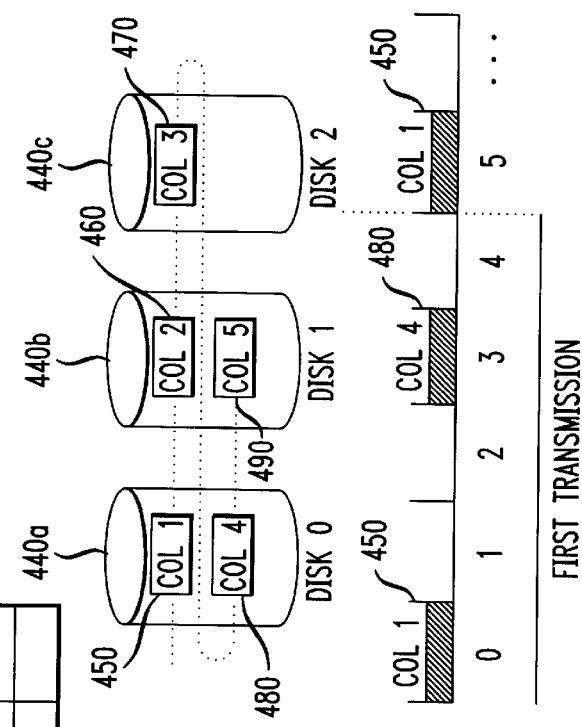
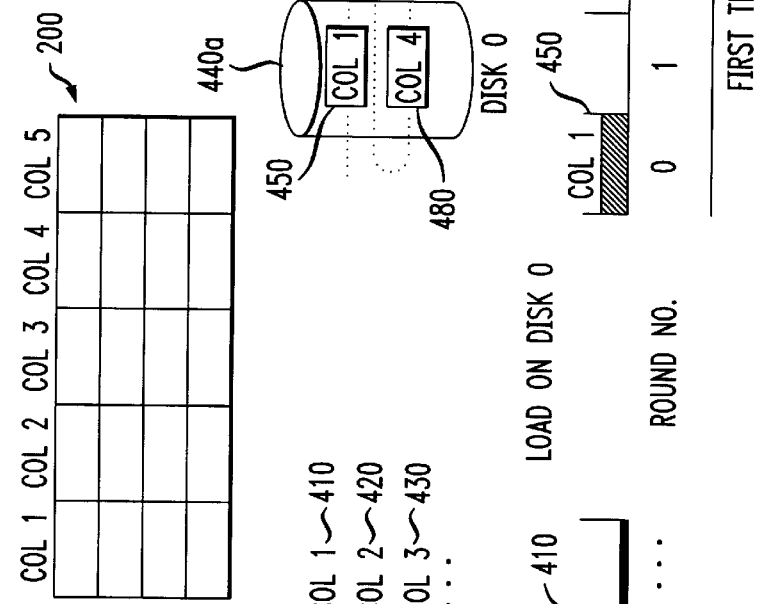
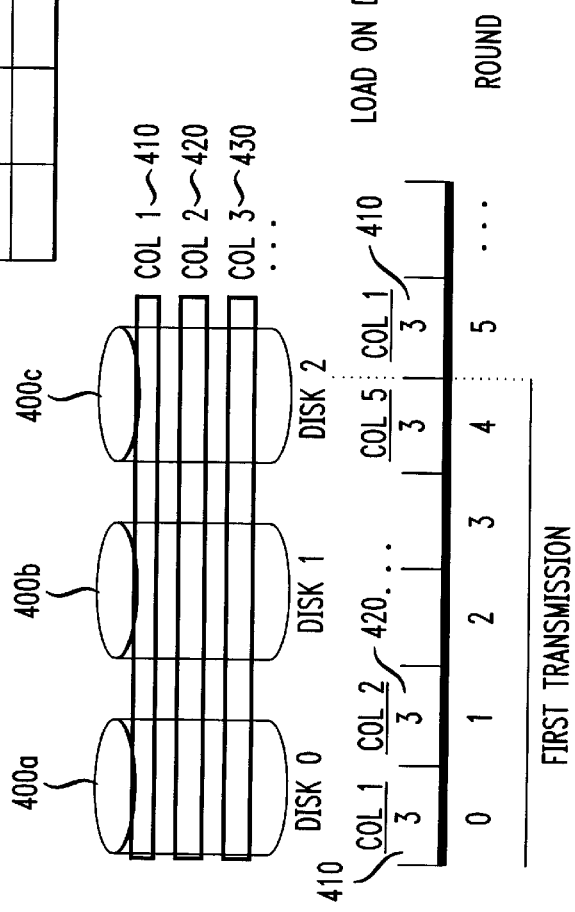
FIG. 4A
FIG. 4B

SCHEDULING RESOURCES FOR CONTINUOUS MEDIA DATABASES

TECHNICAL FIELD OF THE INVENTION

The present invention is directed, in general, to continuous-media-on-demand ("CMOD") services and, more specifically, to systems and methods for increasing the performance of databases that provide CMOD services (so-called "continuous media databases").

BACKGROUND OF THE INVENTION

In recent years, significant advances in both networking technology and technologies involving the digitization and compression of continuous media data (e.g., video and audio data) have taken place. For example, it is now possible to transmit several gigabytes of data per second over fiber optic networks. With compression standards such as Motion Picture Experts Group ("MPEG")-1, the bandwidth required for transmitting video has become relatively low. These advances have resulted in a host of new applications involving the transmission of media over communications and networks, such as Enhanced Pay-Per-View ("EPPV"), video-on-demand ("VOD"), on-line tutorials and interactive television. Continuous-media-on-demand ("CMOD") servers are one of the key components necessary to provide the above applications. Depending on the application, the continuous media servers may be required to store hundreds of media segment programs and concurrently transmit continuous media data to a few hundred clients. The transmission rate for such data is typically a given rate contingent upon the media type and the compression technique employed by the continuous media server. For example, the transmission rate for MPEG-1 is approximately 1.5 Mbps.

Continuous media ("CM") data segments, for example movies and other on-demand programming, are transmitted from random access memory ("RAM") in the CM server to the clients. However, due to the voluminous nature of media segment data (e.g., 100 minute long MPEG-1 video requires approximately 1.125 GB of storage space) and the relatively high cost of RAM, storing media segments in RAM is prohibitively expensive. A cost effective alternative manner for storing media segments on a CM server involves using magnetic or optical disks instead of RAM. The media segments stored on disks, however, needs to be retrieved into RAM before it can be transmitted to clients by the CM server. Modern magnetic and optical disks, however, have limited storage capacity, e.g. 1 GB to 9 GB, and relatively low transfer rates for retrieving data from these disks to RAM, e.g. 30 Mbps to 60 Mbps. This limited storage capacity affects the number of individual media segments that can be stored on the CM server and, along with the low transfer rates, affects the number of clients that can be concurrently serviced. A naive storage scheme in which an entire media segment is stored on an arbitrarily-chosen disk could result in disks with popular media programming being over-burdened with more requests that can be supported, while other disks with less popular programs remain idle. Such a scheme results in an ineffective utilization of disk bandwidth, the term "disk bandwidth" referring to an amount of data which can be retrieved from a disk over a period of time. When data is not being retrieved from a disk, such as when the disk is idle or when a disk head is being positioned, disk bandwidth is not being utilized, and is thus considered wasted. Ineffective utilization of disk bandwidth adversely affects the number of streams a CM server can support at the same time.

To utilize disk bandwidth more effectively, various schemes have been devised where the work load is distributed uniformly across multiple disks, i.e., media segments are laid out on more than one disk. One popular method for storing media segments across a plurality of disks is disk striping, a well known technique in which consecutive logical data units are distributed across a plurality of individually accessible disks in a round-robin fashion. Disk striping, in addition to distributing the work load uniformly across disks, also enables multiple concurrent streams of a media segment to be supported without having to replicate the media segment. Disk striping has two general variations: vertical striping and horizontal striping; these will be explained in greater detail below.

Outstanding requests for media segments are generally serviced by the CM server in the order in which they were received, i.e., first-in first-out ("FIFO"). Where the number of concurrent requests is less than or not much greater than the number of concurrent streams that can be supported by the server, overall response times to all outstanding requests are possible. In VOD environments, however, where the number of concurrent requests typically far exceeds the number of concurrent streams that can be supported by the server, good overall response times are not possible for all outstanding requests using FIFO. To provide better overall response times, VOD environments, such as cable and broadcasting companies, have adopted a paradigm known as enhanced pay-per-view ("EPPV"). Using the enhanced pay-per-view paradigm, CM servers retrieve and transmit media segment streams to clients at fixed intervals or periods.

The average response time to fulfill a client's request is half of the fixed interval, and the worst case response time to fulfill a request is the fixed interval. For example, if a media segment is to begin every 3 minutes, the average time to fulfill a client's request is 1½ minutes; the worst case response time is 3 minutes.

Furthermore, by retrieving popular media segments more frequently, and less popular media segment less frequently, better overall average response times could be achieved. Finally, clients can be informed about the periods and the exact times at which media segments are offered, therefore predictable overall response times can be provided.

Although a set of media segments is schedulable on a CM server employing the EPPV paradigm, determining an exact schedule for periodic display of media segments can be difficult, particularly when the display periods, media segment lengths and transfer rates, i.e. time required to transmit a media segment or segment, differ. The goal is to schedule the set of media segments such that the number of streams scheduled to be transmitted concurrently does not exceed the maximum number of concurrent streams supportable by the CM server. The complexity of scheduling media segments in an EPPV paradigm increases dramatically as the number of media segments being scheduled and the number of server resources by which the media segments are transmitted increases. Accordingly, there is a need for a method and apparatus that can effectively schedule media segments periodically on a CM server employing the EPPV paradigm. More specifically, there is a need in the art for a method and apparatus that can effectively schedule media segments of different popularity and length.

SUMMARY OF THE INVENTION

To address the above-discussed deficiencies of the prior art, the present invention provides various systems and methods of scheduling media segments of varying display rate, length and/or retrieval period on at least one clustered, vertically-striped or horizontally-striped CM database volume. With respect to the at least one clustered database volume or the at least one vertically-striped database volume, one method includes the steps of: (1) associating a display value and a normalized bandwidth consumption with each of the media segments, (2) sorting the media segments in a non-increasing order of value density (which may be, but is not limited to, a ratio of the display value to the normalized bandwidth consumption) to obtain an ordered list thereof and (3) organizing the media segments into the at least one database volume in a particular order. This determined particular order advantageously increases the total display value of the media segments, increasing the ability of the database volume to provide media segments to more clients based on the segments' popularity and within bandwidth constraints.

With respect to the at least one horizontally-striped database volume, one method includes the steps of: (1) associating a display value with each of the media segments, (2) sorting the media segments in a non-increasing order of display value to obtain an ordered list thereof and (3) building a scheduling tree of the media segments, the scheduling tree having a particular structure. The particular structure advantageously increases a total display value of the media segments, increasing, as above, the overall effectiveness of the database volume.

For purposes of the present invention, a "volume" is defined as a logical storage unit. The "volume" may be all or part of a single physical disk drive, a cluster of disk drives, a stripe set or some other arrangement treated as a logical storage unit.

The foregoing has outlined, rather broadly, embodiments of the present invention so that those skilled in the art may better understand the detailed description of the invention that follows. Additional embodiments of the invention will be described hereinafter that form the subject of the claims of the invention. Those skilled in the art should appreciate that they can readily use the disclosed conception and embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 4A and 4B illustrate schematic diagrams of vertical striping and horizontal striping;

DETAILED DESCRIPTION

Figure 1:
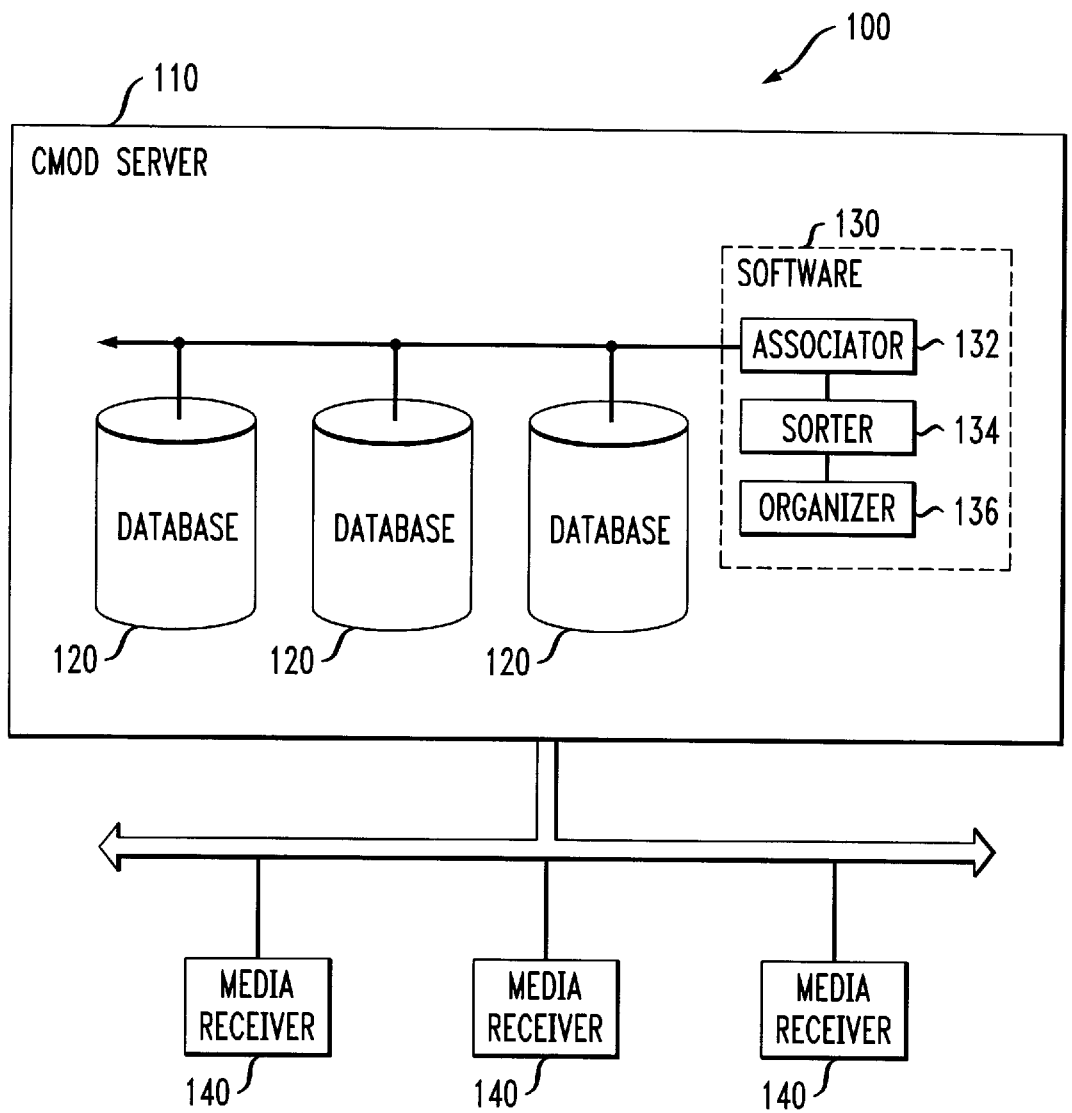
FIG. 1 illustrates an EPPV system containing the scheduling systems and methods of the present invention.

Referring initially to FIG. 1, illustrated is an EPPV system containing the scheduling systems and methods of the present invention. The system, generally designated 100, comprises a CMOD server 110 having at least one database volume 120 associated therewith. Media segments (not shown) are stored on and retrieved from the database volume 120 by scheduling and control circuitry or software 130 that includes an associator 132, a sorter 134 and an organizer 136 therein for associating values with media segments, sorting the media segments according to methods that will be set forth hereinafter and organizing the database volume 120 or building one or more scheduling trees, respectively and as appropriate.

The associator 132, sorter 134 and organizer 136 may be embodied as a sequence of instructions executable within general purpose data processing and storage circuitry (not shown) within the CMOD server 110. In alternate advantageous embodiments, the associator 132, sorter 134 and organizer 136, in whole or in part, may be replaced by, or combined with, any suitable processing configuration, including programmable logic devices, such as programmable array logic ("PALs") and programmable logic arrays ("PLAs"), digital signal processors ("DSPs"), field-programmable gate arrays ("FPGAs"), application-specific integrated circuits ("ASICs"), large scale integrated circuits ("LSIs"), very large scale integrated circuits ("VLSIs") or the like, to form the various types of circuitry described and claimed herein.

FIG. 1 further illustrates a plurality of media receivers 140 (such as personal computers or television sets) that are coupled to the CMOD server 110. The plurality of media receivers 140 receive selected ones of the media segments from the CMOD server 110 and perform (show or play) the media segments for the benefit of a client. Intermediate devices, such as routers or the Public Switched Telephone Network ("PSTN") (not shown) may be interposed between the CMOD server 110 and the plurality of media receivers 140 to assist in distributing the media segments.

Figure 2A:
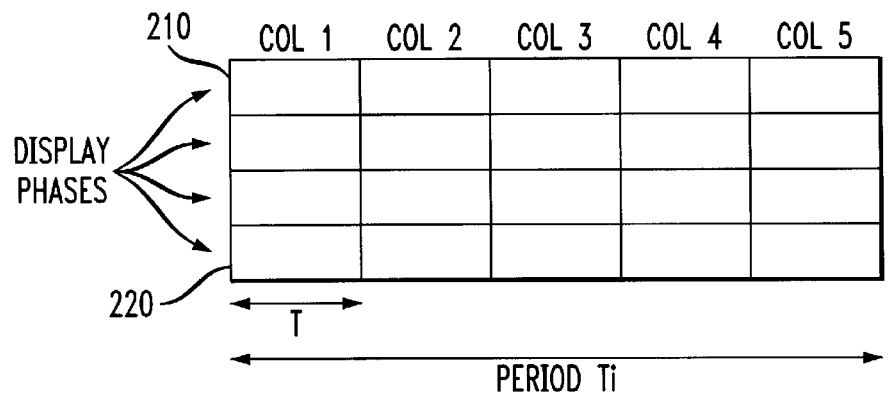
FIGS. 2A and 2B illustrate schematic diagrams of a representative media segment matrix and a layout of the representative segment matrix on a disk.
Figure 2B:
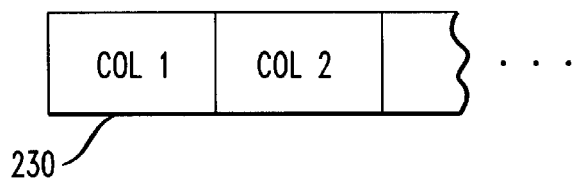

Turning now to FIGS. 2A and 2B, illustrated are schematic diagrams of a representative media segment matrix and a layout of the representative matrix on a disk. The EPPV service model associates with each segment $C_i$ a retrieval period $T_i$ that is the reciprocal of its display frequency. The retrieval period of media segments are multiples of the round length T, and data for streams are retrieved from volumes into memory in rounds of length T.

Each media segment $C_i$ also has a length $l_i$ (in units of time) and a per stream disk bandwidth requirement $r_i$ (known as display rate). The display frequency is determined as a function or characteristic of the popularity of the respective media segments at a given point in time or over a given period of time. As one would expect, segment popularity tends to change over time, as, for example, new movies are introduced and older ones attract less attention.

The matrix-based allocation scheme illustrated in FIG. 2A increases the number of clients that can be serviced under the EPPV service model by laying data based on the knowledge of retrieval periods. The basic idea is to distribute, for each segment $C_i$, the starting points for the concurrent display phases (retrieval of the media segment starting at a given rate) of $C_i$ uniformly across its length. Each such display phase corresponds to a different stream servicing (possibly) multiple clients. Conceptually, each segment $C_i$ is viewed as a matrix 200 consisting of elements of length T (in units of time) arranged in columns 210 and rows 220. The numbers of columns 210 and rows 220 of the matrix 200 depend upon the length $l_i$ of the media segment $C_i$ and its retrieval period $T_i$. The number of columns 210 is min $$\left\{ \left\lceil \frac{l_i}{T} \right\rceil, \left\lceil \frac{T_i}{T} \right\rceil \right\}.$$

The first T units of time of the media segment correspond to the matrix element in the first row 220 and first column 210, the second T units of time of the media segment correspond to the matrix element in the first row 220 and second column 210, and so on.

The matrix 200 is stored on the volume in column-major form such that each column is stored contiguously on the volume. Furthermore, the retrieval of a media segment is performed on columns (i.e., one column per round) with each column element provided to a different display phase.

Figure 3:
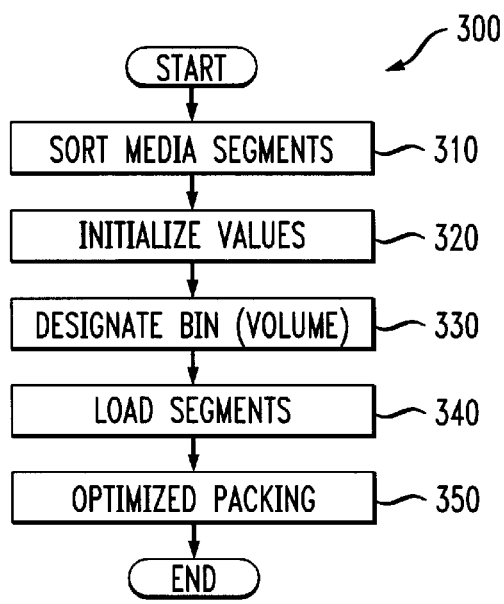
FIG. 3 illustrates a flow diagram of a method of organizing media segments on a disk.

In a clustered CMOD server, each disk is viewed as an independent unit. Entire media segments are stored on, and retrieved from, a single disk; multiple segments can be clustered on a single disk. Turning now to FIG. 3, illustrated is a flow diagram of a method of organizing media segments on the disks of a clustered CMOD server according to the present invention. Each media segment $C_i$ is assigned a value $$\left( \text{e.g.,} \left\lceil \frac{l_i}{T} \right\rceil r_i \right).$$

Furthermore, each media segment has a two dimensional size vector as described below. Each media segment is associated with a value density $p_i$. The value density $p_i$ for media segment $C_i$ is defined as the ratio of value of $C_i$ to the maximum component of the size vector.

The method, generally designated 300, begins in a sorting step 310 wherein segments in C are sorted in non-increasing order of value density to obtain a list L=<$C_1$ ..., $C_n$> where $P_i$ (the value density of $C_i$) is greater than or equal to $P_{i+1}$. Next, in a step 320, load ($B_j$) and value ($B_j$) are initialized to zero. Further, $B_j$ is initialized to an empty set for each bin (i.e., volume or disk) $B_j$, j=1, ..., N.

Next, in steps 330 and 340, an iterative process is undertaken wherein $B_j$ is designated as the first bin (i.e., volume) such that load ($B_j$) plus size ($C_i$) is less than or equal to 1. "Size ($C_i$)" is a two dimensional vector having a first component defined in terms of the normalized contribution of $C_i$ to the length of a round or, equivalently, $C_i$'s normalized bandwidth consumption and a second component defined in terms of $C_i$'s normalized storage capacity.

Next, the load ($B_j$) is made equal to the load ($B_j$)+size ($C_i$), the value ($B_j$) is made equal to the value ($B_j$) plus value ($C_i$) (defined in terms of the bandwidth $C_i$ effectively utilizes during a round), $B_j$ is made equal to $B_j \cup \{C_i\}$ and L is made equal to L-$\{C_i\}$. Finally, in a step 350, $B_{<i>}$, I=1, ..., $n_{disk}$ is made to represent the bins corresponding to the $n_{disk}$ largest of values in the final organizing.

The method may be embodied as a procedure termed "PACKSEGMENTS" set forth in Table I below:

TABLE 1

"PACKSEGMENTS"

Input: A collection of CM segments C = {$C_1$, ..., $C_N$} and a number of disks $n_{disk}$.
Output: C' ⊂ C and a packing of C' in $n_{disk}$ unit capacity bins.
(Goal: Maximize $\Sigma C_i \in C'$ value ($C_i$).)
1. Sort the segments in C in non-increasing order of value to obtain a list L =< $C_1$, ..., $C_N$ > where $p_i \geq p_{i+1}$. Initialize load ($B_j$) = value($B_j$) = 0, $B_j$ = ∅, for each bin (i.e., disk) $B_j$, j=1, ..., N.
2. For each segment $C_i$ in L (in that order):
2.1 Let $B_j$ be the first bin (i.e., disk) such that load ($B_j$) + size($C_i$) ≤ 1.
2.2 Set load($B_j$) = load($B_j$) + size($C_i$), value($B_j$) = value($B_j$) + value($C_i$), $B_j$ = $B_j \cup \{C_i\}$, and L = L-$\{C_i\}$.
3. Let $B_{<i>}$, I=1, ..., $n_{disk}$ be the bins corresponding to the $n_{disk}$ largest values in the final packing. Return C' = $\cup^{ndisk}_{i=1} B_{<i>}$. (The packing of C' is defined by the $B_{<i>}$'s).

Turning now to FIGS. 4A and 4B, illustrated are schematic diagrams of vertical striping and horizontal striping. In vertical striping (FIG. 5A), each column 410, 420, 430 of a given segment matrix is declustered across all disks 400A, 400B, 400C of a given CMOD server. This scheme is similar to fine-grained striping or RAID-3 data organization, since each column of each segment has to be retrieved in parallel from all disks (as a unit). "PACKSEGMENTS" is able to operate with vertical striping. In this case, the size vector for each media segment is one-dimensional and consists of the normalized bandwidth requirement (or consumption) for the media segment.

In horizontal striping (FIG. 4B) the columns 450, 460, 470, 480, 490 of a given segment matrix are mapped to individual disks 440A, 440B, 440C in a round-robin manner. Consequently, the retrieval of data for a transmission of $C_i$ proceeds in a round-robin fashion along the disk array. During each round, a single disk is used to read a column of $C_i$ and consecutive rounds employ consecutive disks.

Consider the periodic retrieval of $C_i$ from a specific disk. By virtue of the round-robin placement during each transmission of $C_i$, a column of $C_i$ must be retrieved from that disk periodically at intervals of $n_{disk}$ rounds. Furthermore, to support EPPV service, the transmissions of $C_i$ are themselves periodic, with a period $T_i = n_i \cdot T$. Thus, the retrieval of $C_i$ from a specific disk is a collection of periodic real time tasks with period $T_i$ (i.e., the media segment's transmission), where each task consists of a collection of subtasks that are $n_{disk} \cdot T$ time units apart (i.e., column retrievals within a transmission). A simplified version of this problem occurs when, for each media segment $C_i$, $l_i \leq n_{disk} \cdot T$ holds. In this case, periodic retrieval of a media segment consists of a simple periodic task.

Figure 5A:
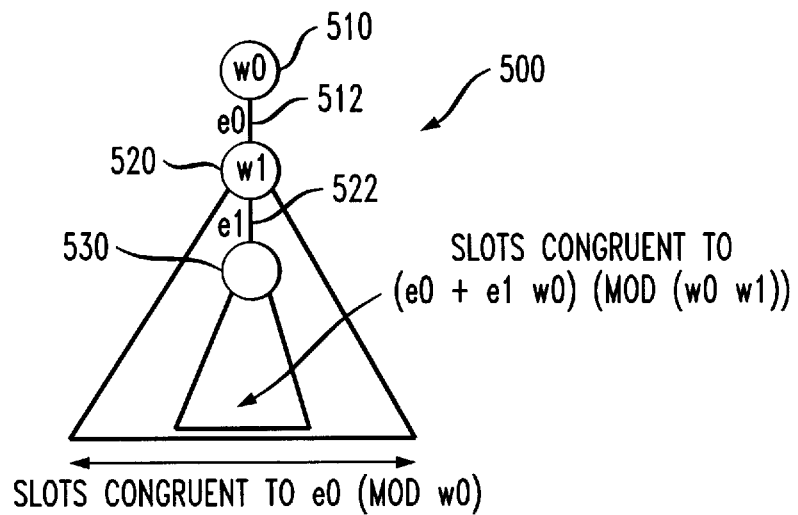
FIGS. 5A, 5B, 6A and 6B illustrate a generalized scheduling tree structures for simple periodic tasks according to the present invention and a particular scheduling tree structure for an exemplary set of tasks.
Figure 5B:
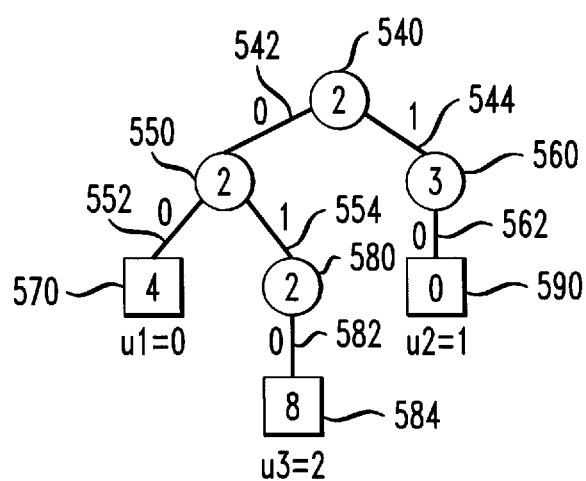

Turning now to FIGS. 5A and 5B, illustrated are a generalized scheduling tree structure 500 for simple periodic tasks, where this task model is applicable to media segments for which $l_i \leq n_{disk} \cdot T$ holds, according to the present invention and a particular scheduling tree structure for an exemplary set of tasks for which $l_i \leq n_{disk} \cdot T$ (containing nodes 540, 550, 560, 570, 580, 590 and edges 542, 544, 552, 554, 562, 582). FIGS. 5A and 5B are presented primarily for the purpose of providing an overview of the scheduling tree structure concept of the present invention. A scheduling tree (of the present invention and as described below) determines a "conflict-free" schedule for the periodic retrieval of media segments that are part of the scheduling tree. That is, the retrieval of these media segments will not collide in a round.

One fundamental concept of the present invention is that all tasks in a subtree rooted at some edge 512, 522 emanating from node n (such as a node 510) at level 1 uses time slot numbers that are congruent to I(mod $\pi_1$ (n)) where I is a unique number between 0 and $\pi_1$ (n)−1. Satisfying this invariant recursively at every internal node 520, 530 ensures the avoidance of conflicts.

An internal node n at level 1 is candidate for period $n_i$ ($n_i = T_i/T$) if and only if $\pi_{l-1}(n) | n_i$ and gcd $$\left( w(n), \frac{n_i}{\Pi_{l-1}(n)} \right) \geq \frac{w(n)}{w(n) - e(n)} .$$

A period n, can be scheduled under any candidate node n in a scheduling tree. Two possible cases exist:

If $\pi_1(n) | n_i$ then the condition above guarantees that n (in a tree having a node 600 and edges 610a, 610b, 610c) has at least one free edge 610d at which $n_i$ can be placed.

If $\pi_1(n) \nmid n_i$ then, to accommodate $n_i$ under node n (in a tree having a node 600 and edges 620a, 620b, 620c, 620d, 630a, 630b, 630c), n must be split so that the defining properties of the scheduling tree structure are kept intact. This may be done as follows. Let $$d = gcd \left( w(n), \frac{n_i}{\Pi_{l-1}(n)} \right) .$$

Node n is split into a parent node with weight d and child nodes with weight $$\frac{w(n)}{d} ,$$

with the original children of n divided among the new child nodes; that is, the first batch of $$\frac{w(n)}{d}$$

children of n are placed under the first child node, and so on. It is apparent that this splitting maintains the properties of the structure. Furthermore, the condition set forth above guarantees that the newly created parent node will have at least one free edge for scheduling $n_i$.

The set of candidate nodes for each period to be scheduled can be maintained efficiently, in an incremental manner. The observation here is that when a new period $n_i$ is scheduled, all remaining periods advantageously only have to check a maximum of three nodes, namely the two closest ancestors of the leaf for $n_i$ and, if a split occurred, the last child node created in the split, for possible inclusion or exclusion from their candidate sets.

As above, each task is assumed to be associated with a value and that improving the cumulative value of a schedule is the objective. The basic idea of the heuristic of one aspect of the present invention (termed BUILDTREE) is to build the scheduling tree incrementally in a greedy fashion, scanning the tasks in non-increasing order of value and placing each period $n_i$ in that candidate node M that implies the minimum value loss among all possible candidates. This loss is calculated as the total value of all periods whose candidate sets become empty after the placement of $n_i$ under M. Ties are always broken in favor of those candidate nodes that are located at higher levels (i.e., closer to the leaves), while ties at the same level are broken using the postorder node numbers (i.e., left-to-right order). When a period is scheduled in Γ, the candidate node sets for all remaining periods are undated (in an incremental fashion) and the method continues with the next task/period (with at least one candidate in 1').

Figure 6A:
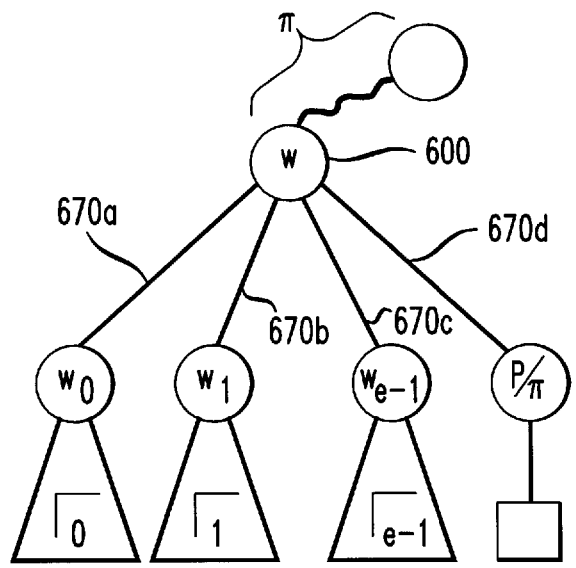
Figure 6B:
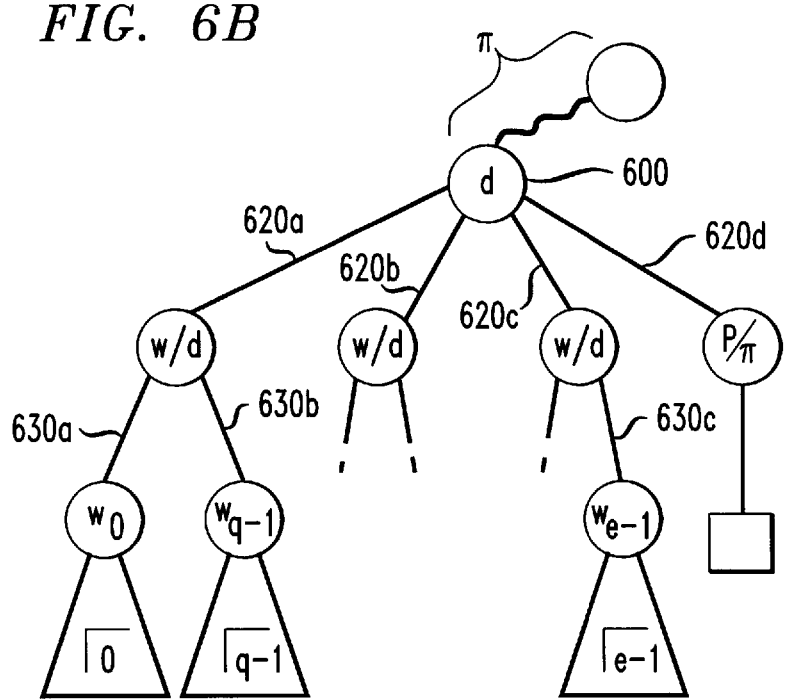
Figure 7:
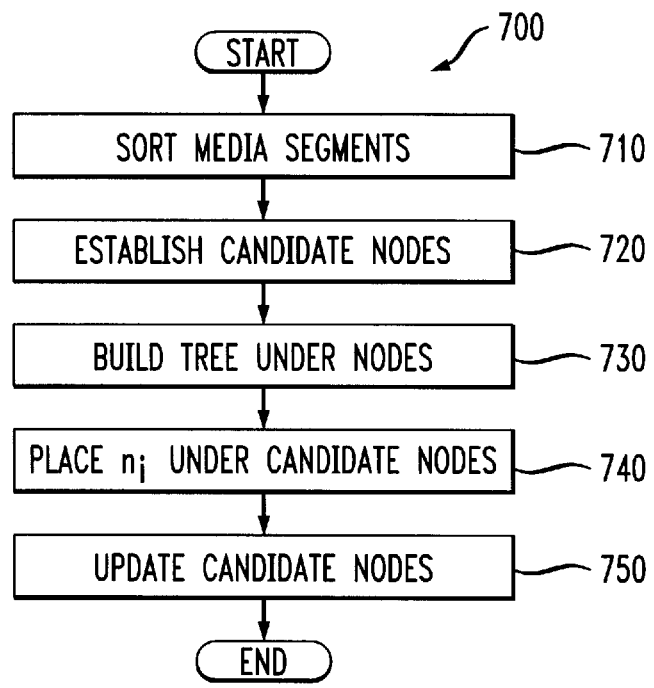
FIG. 7 illustrates a flow diagram of a method of building a scheduling tree.

FIG. 6 illustrates a flow diagram of a method 600 of building a scheduling tree for a limited segment model wherein $l_i \leq T$. The method 600 may be embodied as a procedure termed "BUILDTREE" set forth in Table II below:

TABLE II

"BUILDTREE"

1. Input: A set of simple periodic tasks C = {$C_1, \ldots, C_N$} and $1_i \leq n_{disk}$. T with corresponding periods P = {$n_1, \ldots, n_N$}, and a value () function assigning a value to each $C_i$.
Output: A scheduling tree Γ for a subset C' of C. (Goal: Maximize $\Sigma C_i \in C'$ value ($C_i$).)
1. Sort the tasks in C in non-increasing order of value to obtain a list L = <$C_1, C_2, \ldots, C_N$>, where value ($C_i$) ≥ value ($C_{i+1}$).
Initially, Γ consists of a root node with a weight equal to $n_1$.
2. For each periodic task $C_i$ in L (in that order):
2.1 Let cand($n_i$, Γ) be the set of candidate nodes for $n_i$, in . (Note that this set is maintained incrementally as the tree is built.)
2.2 For each n ∈ cand($n_i$, Γ), let Γ∪{$n_i$}$_n$ denote the tree that results when $n_i$ is placed under node n in 64 . Let loss(n) - {$C_j$, ∈ L-{$C_i$}| cand(Γ∪{$n_i$}$_n$) = ∅}
and value loss(n)) = $\Sigma c_{j \in loss(n)}$ value($C_j$).
2.3 Place $n_i$ under the candidate node M such that value (loss (M)) = $\min_{n \in cand (ni, 1)}$ {value(loss (n)) }. (Ties are broken in favor of nodes at higher levels.) If necessary, node M is split.
2.4 Set Γ = Γ∪{$n_i$}$_M$, L=L-loss(M).
2.5 For each task $C_j$, ∈ L, update the candidate node set cand($n_j$, Γ).

With reference to FIG. 6, the method begins in a step 610 wherein media segments (tasks) are sorted in a non-increasing order of value to obtain a list L=<$C_1, C_2, \ldots, C_N$>. Next, for each periodic task in order, a candidate set of nodes is developed (in a step 620, a tree is built iteratively (in a step 630), where $n_i$ is placed under a selected candidate node (in a step 640) and candidate nodes are updated for remaining periods (in a step 650).

Let N be the number of tasks in C. The number of internal nodes in a scheduling tree is always going to be O(N). To see this, note that an internal node will always have at least two children, with the only possible exception being the rightmost one or two new nodes created during the insertion of a new period. Since the number of insertions is at most N, it follows that the number of internal nodes is O(N). Based on this fact, it is easy to show that BUILDTREE runs in time $O(N^3)$.

Example 2: Consider the list of periods<$n_1$=2, $n_2$=12, $n_3$=30>(sorted in non-increasing order of value). Turning now to FIGS. 7A through 7D, illustrated is the step-by-step construction of the scheduling tree (comprising nodes 700, 710, 720, 710a, 710b, 730a, 730b) using BUILDTREE. Note that period $n_3$ splits the node with weight 6 into two nodes with weights 3 and 2 (the node 720 splits into nodes 720a, 720b).

In the general case, when the lengths of the media segments are not restricted, periodic media segment retrieval under horizontal striping was defined above as a periodic real-time task $C_i$ with period $$n_i = \frac{T_i}{T}$$

(in rounds) that consists of a collection of $$\left\lceil \frac{c_i}{n_{disk}} \right\rceil$$

subtasks ($c_i$ being the number of columns in the matrix for media segment $C_i$) that need to be scheduled $n_{disk}$ rounds apart. The basic observation here is that all the subtasks of $C_i$ are themselves periodic with period $n_i$, so the techniques of the previous section can be used for each individual subtask. However, the scheduling method also needs to ensure that all the subtasks are scheduled together, using time slots (i.e., rounds) placed regularly at intervals of $n_{disk}$. Heuristic methods for building a scheduling tree in this generalized setting will now be set forth in detail.

An important requirement of this more general task model is that the insertion of new periods cannot be allowed to distort the relative placement of subtasks already in the tree. The splitting mechanism described in the previous section for simple periodic tasks does not satisfy this requirement, since it can alter the starting time slots for all subtasks located under the split node. Instead, the present invention employs a different method for "batching" the children of the node being split, so that the starting time slots for all leaf nodes remain unchanged. This new splitting rule is as follows: if the node n is split to give a new parent node with weight d, then place at edge I of the new node (I=0, ..., d-1) all the children of the old node n whose parent edge weight was congruent to I(mod d).

Figure 8D:
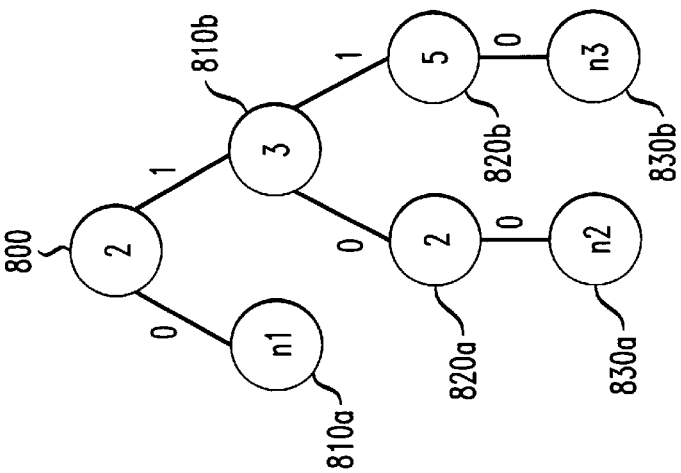
FIGS. 8A through 8D illustrate an exemplary scheduling tree being built according to the method illustrated in FIG. 7.
Figure 8C:
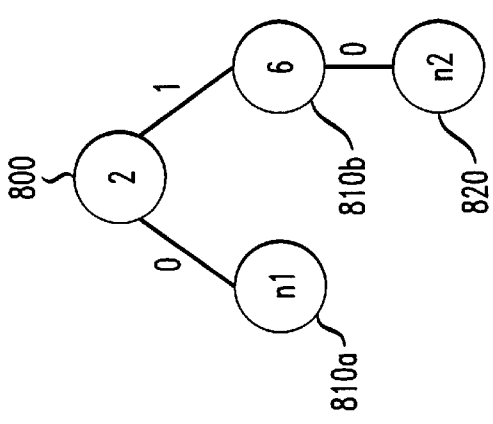
Figure 8B:
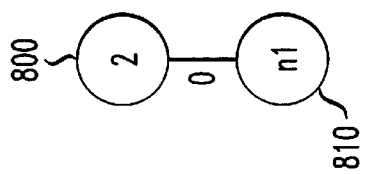
Figure 8A:
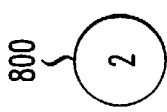

Turning now to FIGS. 8A and 8B, illustrated are an exemplary scheduling tree (having nodes 800, 810a, 810b) before and after a split therein using the above-described splitting rule of the present invention (and adding a node 810c). Example 3: FIG. 8A illustrates a scheduling tree with two tasks with periods $n_1=6$, $n_2=6$ assigned to slots 0 and 1. FIG. 8B depicts the scheduling tree after a third task with period $n_3=15$ is inserted. Although there is enough capacity for both $n_1$ and $n_2$ in the subtree connected to the root with edge 0, the splitting rule of the present invention forces $n_2$ to be placed in the subtree connected to the root with edge 1.

In this setting, the notion of a candidate node is defined as follows: an internal node n at level l is candidate for period $n_i$ if and only if $\pi_{l-1}(n)|n_i$ and there exists an $I \in \{0, \ldots, d-1\}$ such that all edges of n with weights congruent to I (mod d) are free, where $$d = gcd\left(w(n), \frac{n_i}{\Pi_{l-1}(n)}\right).$$

However, under the generalized model of periodic tasks of the present invention, a candidate node for $n_i$ can only accommodate a subtask of $C_i$. This is clearly not sufficient for the entire task. The temporal dependency among the subtasks of $C_i$ means that the scheduling tree method of the present invention should make sure that all the subtasks of $C_i$ are placed in the tree at distances of $n_{disk}$.

One way to deal with this situation is to maintain candidate nodes for subtasks and use a simple predicate based on the equation:

$$u_i = \text{ancestor\_edge}_1(n_i) + \sum_{j=2}^{l} \text{ancestor\_edge}_j(n_i) \cdot \Pi_{j-2}(n_i).$$

for checking the availability of specific time slots in the scheduling tree. The scheduling of $C_i$ can then be handled as follows. Select a candidate node for $n_i$ and a time slot $u_i$ for $n_i$ under this candidate. Place the first subtask of $C_i$ in $u_i$ and call the predicate repeatedly to check if $n_i$ can be scheduled in slot $u_i$ $$j = 1, \ldots, \left\lceil \frac{c_i}{n_{disk}} \right\rceil$$

If the predicate succeeds for all j, then $C_i$ is scheduled starting at $u_i$. Otherwise, the method can try another potential starting slot $u_i$.

A problem with the approach outline above is that even if the number of starting slots tried for $C_i$ is restricted to a constant, scheduling each subtask individually yields pseudo-polynomial time complexity. This is because the number of scheduling operations in a trial will be $$0\left(\frac{c_i}{n_{disk}}\right),$$

where $$c_i = \min\left(n_i, \frac{l_i}{T}\right)$$

is part of the problem input.

The present invention provides a polynomial time heuristic method for the problem. To simplify the presentation, it is assumed that every period $n_i$ is a multiple of $n_{disk}$. Although it is possible to extend the heuristic described herein to handle general periods, it is believed that this assumption is not very restrictive in practice. This is because round lengths T are typically expected to be in the area of a few seconds and periods $T_i$ are typically multiples of some number of minutes (e.g., 5, 10, 30 or 60 minutes). Therefore, it is realistic to assume the smallest period in the system can be selected to be a multiple of $n_{disk}$. The objective is to devise a method that ensures that if the first subtask of a task $C_i$ does not collide with the first subtask of any other task in the tree, then no other combination of subtasks can cause a collision to occur. This means that once the first subtask of $C_i$ is placed in the scheduling tree there is no need to check the rest of $C_i$'s subtasks individually.

The method of the present invention sets the weight of the root of the scheduling tree to $n_{disk}$. (This is possible since the $n_i$'s are multiples of ndisk.) This implies that consecutive subtasks of a task will require consecutive edges emanating from nodes at the first level (direct descendents of the root), which are first-level ancestors of the leaf nodes where the subtasks are placed. When the first subtask of a task is placed at a leaf node, at least some of the consecutive edges of the first-level ancestor node of that leaf are disabled, so that the slots under those edges cannot be used by the first subtask of any future task. By the previous observation, $$s_i - 1 = \left\lceil \frac{c_i}{n_{disk}} \right\rceil - 1$$

consecutive edges of the first-level ancestor of the leaf for $n_i$ must be disabled, starting with the right neighbor of the edge under which that leaf resides. ($s_i$ is the number of subtasks of $C_i$.) This "edge disabling" is implemented by maintaining an integer distance for each edge e emanating from a first-level node that is equal to the number of consecutive neighbors of edge e that have been disabled. The placement method of the present invention should maintain two invariants. First, the distance of an edge e of a first-level node is always equal to $\max_{C_1}\{s_i\}-1$, where the max is taken over all tasks placed under e in the tree. Second, the sum of the weight of an edge e of a first-level node n and its distance is always less than the weight of n (so that the defining properties of the tree are maintained). Based on the above method, the notion of a candidate node can be defined as follows: let n be an internal node at level l. Let $n_i$ be a period and define $$d = gcd\left(w(n), \frac{n_i}{\Pi_{l-1}(n)}\right).$$

Node n is candidate for period $n_i$ if and only if $\pi_{l-1}(n)|n_i$ and the following conditions hold:

1. If n is the root node, n has a free edge.
2. If level(n)=1, there exists an I $\in \{0, \ldots, d-1\}$ such that all (non-disabled) edges of n whose sum of weight plus distance is congruent to (I+j) (mod d), for $0 \leq j < s_i$, are free.
3. If level(n)$\geq 2$,
   3.1 there exists an I $\in \{0, \ldots, d-1\}$ such that all edges of n with weight congruent to I (mod d) are free; and,
   3.2 $s_i-1$—ancestor_edge$_2$ (n)<ancestor-node$_1$ (n) and $s_i$+ancestor_edge$_2$ (n) is less than or equal to the weight of the (non-disabled) edge following ancestor_edge$_2$ (n), if there is such an edge.

Note that clause 2 ensures that edge distances are maintained when the first-level nodes are split.

Figure 9A:
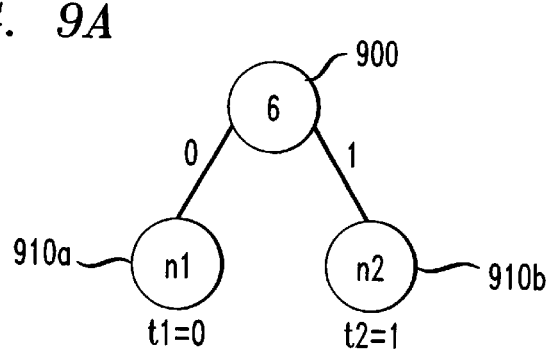
FIGS. 9A and 9B illustrate an exemplary scheduling tree before and after a split therein.
Figure 9B:
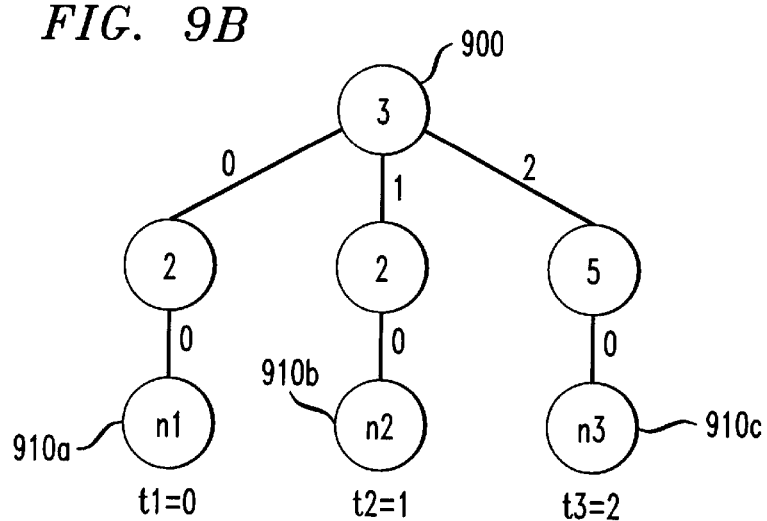

Turning now to FIG. 9, illustrated is a flow diagram of a method 900 of building a scheduling tree for periodic tasks having equidistant subtasks. The method 900 may be embodied as a procedure termed "BUILDEQUIDTREE" set forth in Table III below:

TABLE III

"BUILDEQUIDTREE"

Input: A set of periodic tasks C = $\{C_1, \ldots, C_N\}$ with
corresponding periods P = $\{n_1, \ldots, n_N\}$ and a value () function
assigning a value to each $C_i$. Each task consists of subtasks
placed at intervals of $n_{disk}$.
Output: A scheduling tree $\Gamma$ for a subset C' of C. (Goal: Maximize
$\Sigma_{c_i \in C'}$ value ($C_i$).)
1. Sort the tasks in C in non-increasing order of value to obtain
a list L = < $C_1, C_2, \ldots, C_N$ >, where value ($C_i$) $\geq$
value ($C_{i+1}$). Initially, $\Gamma$ consists of a root node with a weight equal to
$n_{disk}$.
2. For each task $C_i$ in L (in that order):
2.1 Select a candidate node n for n, in $\Gamma$. (Ties are broken
in favor of nodes at higher levels).
2.2 If w(n)|/ni, split n.
2.3 Schedule the first subtask of $C_i$ under n. (Ties are
broken in favor of edges with smaller weights).

TABLE III-continued

"BUILDEQUIDTREE"

2.4 Let d be the distance of the ancestor edge at the first
level of the leaf corresponding to $n_i$. Set the distance of
this edge to max$\{d, s_i - 1\}$.

BuildEquidTree can be used to construct a scheduling tree in polynomial time. With reference to FIG. 9, the method 900 begins in a step 910 wherein the tasks are sorted in a non-increasing order of value to obtain a list L=<$C_1, C_2, \ldots, C_N$>. Next, for each periodic task in order, a candidate node n is selected (in a step 920), n is split if w(n) $\nmid$ $n_i$ (in a step 930), the first subtask of the task is scheduled under n (in a step 940) and edge distances are set (in a step 950).

Figure 10:
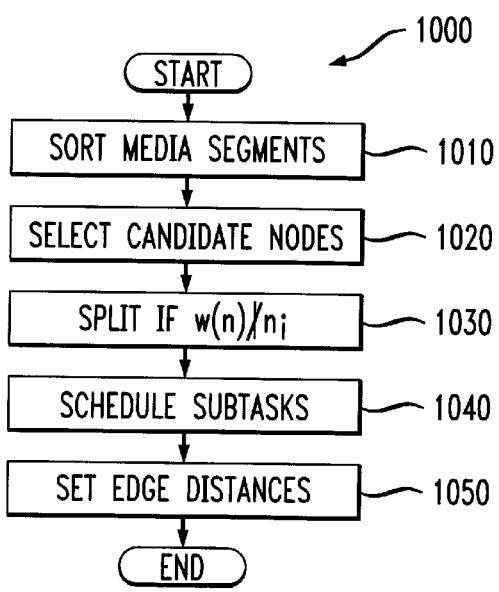
FIG. 10 illustrates a flow diagram of a method of building a scheduling tree having equidistant subtasks.

Turning now to FIGS. 10A through 10C, illustrated are an exemplary scheduling tree (variations of which are designated 1000, 1010, 1020) with equidistant subtasks being built according to the method illustrated in FIG. 10. Example 4: Consider three tasks $C_1, C_2, C_3$ with $s_1, s_2, s_3$=2, 1, 3 and $n_1, n_2, n_3$=12, 18, 10 and $n_{disk}$=2. FIGS. 10A through 10C illustrate the three states of scheduling tree after placement of $C_1, C_2$ and $C_3$, respectively.

An interesting property of the scheduling tree formulation is that it can easily be extended to handle time slots that can fit more than one subtask (i.e., can allow for some tasks to collide). As set forth above, this is exactly the case for the rounds of EPPV retrieval under horizontal striping. The subtasks of $C_i$ can be thought of as items of size ($C_i$)$\leq 1$ (i.e., the fraction of disk bandwidth required for retrieving one column of media segment $C_1$) that are placed in unit capacity time slots. In this more general setting, a time slot can accommodate multiple tasks as long as their total size does not exceed one.

The problem can be visualized as a collection of unit capacity bins (i.e., time slots) located at the leaves of a scheduling tree, whose structure determines the eligible bins for each task's subtasks (based on their period). With respect to the previous model of tasks, the main difference is that since slots can now accommodate multiple retrievals it is possible for a leaf node that is already occupied to be a candidate for a period. Hence, the basic idea for extending the methods of the present invention to this case is to keep track of the available slot space at each leaf node and allow leaf nodes to be shared by tasks. Thus, the notion of candidate nodes can simply be extended as follows: let n be a leaf node of a scheduling tree r corresponding to period p. Also let S(n) denote the collection of tasks (with period p) mapped to n. The load of leaf n is defined as: load(n)=$\Sigma_{C_i \in S(n)}$ size($C_i$).

A node n at level l is candidate for a task of $C_i$ (with period $n_i$) if and only if:

1. n is internal, conditions in the previous definition of candidate node hold, or
2. n is external (leaf node) corresponding to $n_i$ (i.e., $\pi_1$ (n)=$n_i$), and load(n)+size ($C_i$)$\leq 1$.

With these extensions, it is easy to see that the BuildEquidTree method can be used without modification to produce a scheduling tree for the multi-task capacity case.

To construct forests of multiple non-colliding scheduling trees, trees already built can be used to restrict task placement in the tree under, construction. By the Generalized Chinese Remainder Theorem, the scheduling method needs to ensure that each subtask of task $C_i$ is assigned a slot $u_i$ such that $u_i \neq u_j$ (mod gcd ($n_i, n_j$)) for any subtask of any task $C_j$ that is scheduled in slot $u_j$ in a previous tree within the same forest. A general packing-based method set forth below can be used for combining independently built scheduling forests. Of course, a forest can always consist of a single tree. The objective is to improve to the utilization of scheduling slots that can accommodate multiple tasks.

Given a collection of tasks, scheduling forests are constructed until each task is assigned a time slot. No pair of tasks within a forest will collide at any slot except for tasks with the same period that are assigned to the same leaf node as described in Section 5.3. A simple conservative approach is to assume a worst-case collision across forests. That is, the size of a forest $F_i$ is defined as size $(F_i) = \max_{n \in Fi}$ (load $(n_j)$) where $n_j$ is any leaf node in $F_i$, and the load of a leaf node is as given above. Further, a forest $F_i$ has a value: value $(F_i) = \Sigma_{C_j \in Fi}$ value $(C)_j$. Thus, under the assumption of a worst-case collision, the problem of maximizing the total scheduled value for a collection of forests is a traditional 0/1 knapsack optimization problem. A packing-based heuristic as PACKSEGMENTS can be used to provide an approximate solution.

In some cases, the worst-case collision assumption across forests may be unnecessarily restrictive. For example, consider two scheduling trees $\Gamma_1$ and $\Gamma_2$ that are constructed to be independently. Let $e_1$ be an edge emanating from the root node $n_1$ of $\Gamma_1$ and $e_2$ be an edge emanating from the root node $n_2$ of $\Gamma_2$. If $e_1$ mod (gcd $(n_1, n_2)) \neq e_2$ mod (gcd $(n, n_2)$) holds, then the tasks scheduled in the subtrees rooted at $e_1$ and $e_2$ can never collide. Using such observations, more sophisticated packing-based methods for combining forests can be constructed.

Preliminary performance experimentation has been undertaken to compare the average performance of the methods introduced in by the present invention for supporting EPPV service. For the experiments, two basic workload components were employed, modeling typical scenarios encountered in today's pay-per-view CMOD media segment servers.

Workload #1 consisted of relatively long MPEG-1 compressed media segments with a duration between 90 and 120 minutes (e.g., movie features). The display rate for all these media segments was equal to $r_i$=1.5 Mbps. To model differences in media segment popularity, the workload comprised two distinct regions: a "hot region" with retrieval periods between 40 and 60 minutes and a "cold region" with periods between 150 and 180 minutes.

Workload #2 consisted of small media segment segments with lengths between 2 and 10 minutes (e.g., commercials or music media segments). The display rates for these media segments varied between 2 and 4 Mbps (i.e., MPEG-1 and 2 compression. Again, segments were divided between a "hot region" with periods between 20 and 30 minutes and a "cold region" with periods between 40 and 60 minutes.

Each component was executed in isolation and mixed workloads consisting of mixtures of type #1 and type #2 workloads were also investigated. The basic performance metric was the effectively scheduled disk bandwidth (in Mbps) for each of the resource scheduling methods introduced by the present invention. Scaleup experiments in which the offered load (i.e., number of segments to be scheduled) was proportionate to the system size (i.e., number of disks in the server) were concentrated upon. Further, in all cases, the expected storage requirements of the offered load were insured to be approximately equal to the total disk capacity. This allowed the storage capacity constraint for the striping-based methods to be ignored.

Figure 11C:
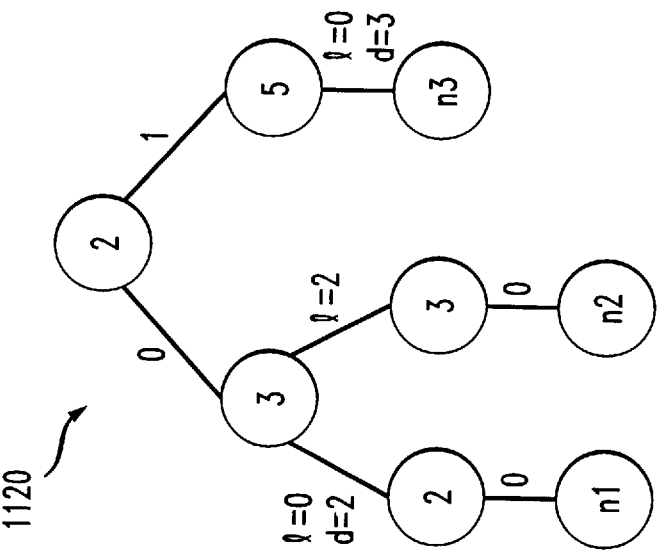
FIGS. 11A through 11C illustrate an exemplary scheduling tree with equidistant subtasks being built according to the method illustrated in FIG. 9.
Figure 11B:
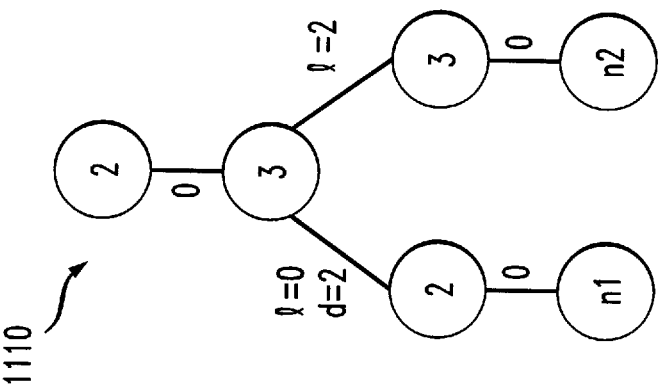
Figure 11A:
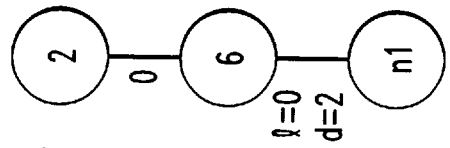

The results of the experiments, with type #1 workloads with hot regions of 30% (a graph 1100) and 10% (a graph 1110) are shown in FIGS. 11A and 11B, respectively. Clearly, the horizontal striping-based method outperforms both clustering and vertical striping over the entire range of values for the number of disks. Observe that for type #1 workloads, the maximum number of segments that can be scheduled is limited by the aggregate disk storage. Specifically, it is easy to see that the maximum number of segments that can fit in a disk is 3.95 the average number of concurrent streams for a segment is (0.3·3+0.7·1)=1.6. Thus the maximum bandwidth that can be utilized on a single disk for this mix of accesses is 1.6·3.95·1.5=9.48 Mbps. This explains the low scheduled bandwidth output shown in FIGS. 11A and 11B. Note that, in most cases, the scheduling tree heuristics of the present invention were able to schedule the entire offered workload of segments. On the other hand, the performance of vertical striping methods quickly deteriorates as the size of the disk array increases.

The performance of the clustering method of the present invention under Workload #1 suffers from the disk storage fragmentation due to the large segment sizes. A deterioration can also be observed in the performance of clustering as the access skew increases (i.e., the size of the hot region becomes smaller). This can be explained as follows: PACKSEGMENTS first tries to organize the segments that give the highest profit (i.e., the popular segments). Thus when the hot region becomes smaller the relative value of the scheduled subset (as compared to the total workload value) decreases.

Figure 12A:
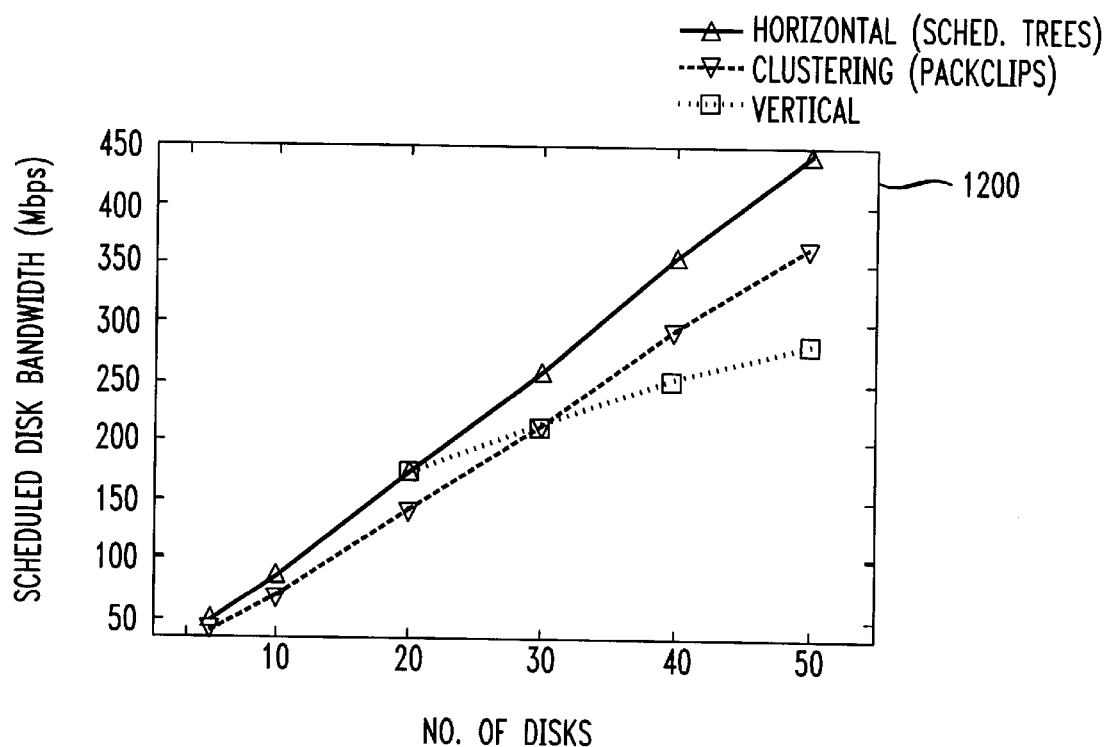
FIGS. 12A and 12B illustrate graphical representations of workloads under simulated conditions for the resource scheduling systems and methods of the present invention.

The relative performance of the three methods for a type #2 workload with a 50% hot region is depicted in FIG. 12A (a graph 1200). Again, the horizontal striping-based method outperforms both clustering and vertical striping over the entire range of $n_{disk}$. Note that, compared to type #1 workloads, the relative performance of clustering and vertical striping methods under this workload of short segments is significantly worse. This is because both these methods, being unaware of the periodic nature of segment retrieval, reserve a specific amount of bandwidth for every segment $C_i$ during every round of length T. However, for segments whose length is relatively small compared to their period, this bandwidth is actually needed only for small fraction of rounds. FIG. 12A clearly demonstrates the devastating effects of this bandwidth wastage and the need for periodic scheduling methods.

Figure 12B:
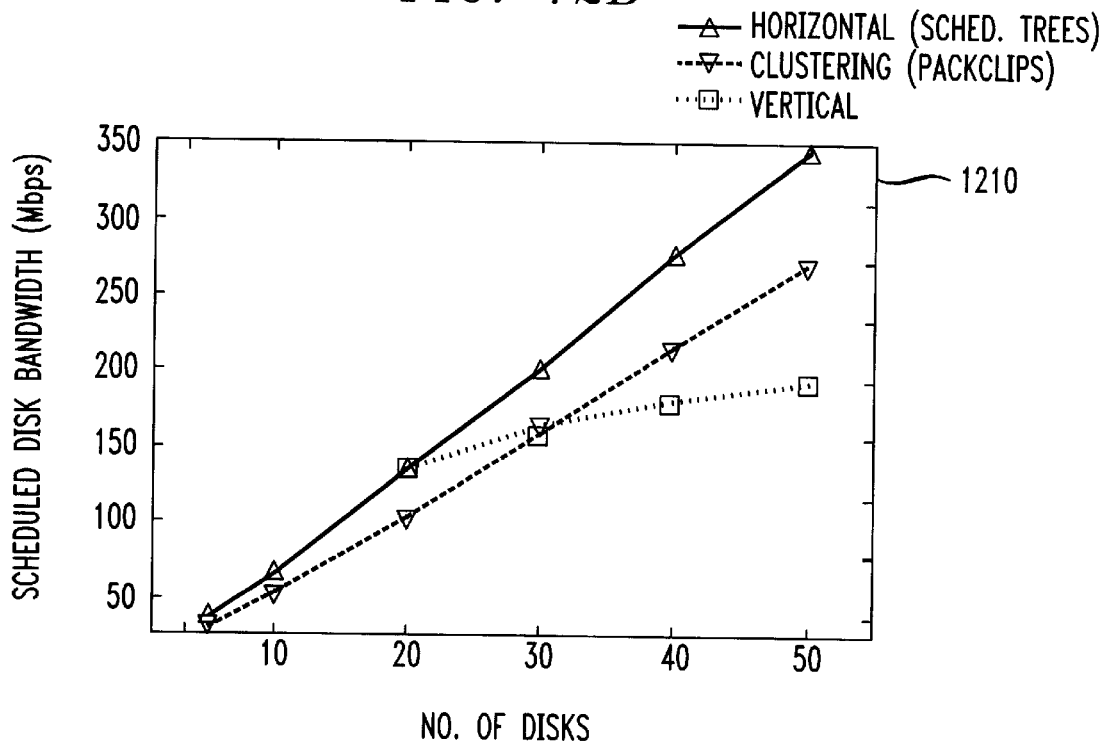
Figure 13A:
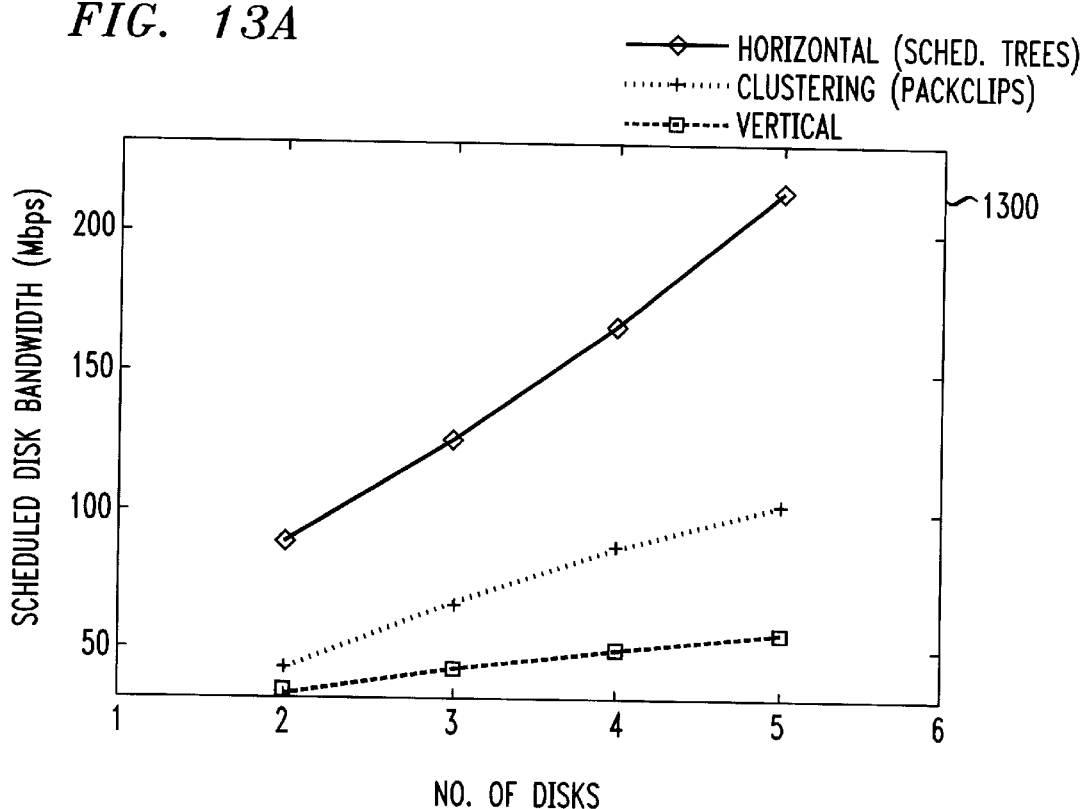
FIGS. 13A and 13B illustrate further graphical representations of workloads under simulated conditions for the resource scheduling systems and methods of the present invention.
Figure 13B:
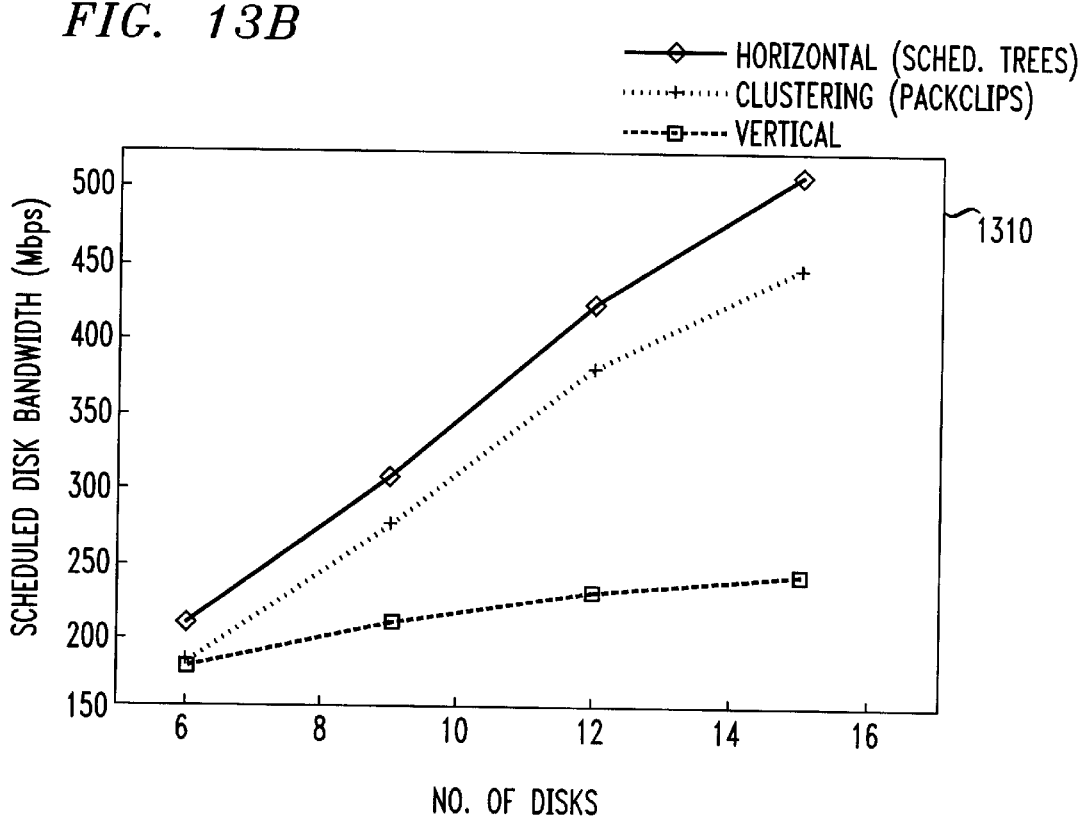

Finally, FIG. 12B depicts (in a graph 1210) the results obtained for a mixed workload consisting of 30% type #1 segments and 70% type #2 segments. Horizontal striping is once again consistently better than vertical striping and clustering over the entire range of disk array sizes. Compared to pure type #1 or #2 workloads, the clustering-based method is able to exploit the non-uniformities in the mixed workload to produce much better packings. This gives clustering a clear win over vertical striping. Still, its wastefulness of disk bandwidth for short segments does not allow it to perform at the level of horizontal striping.

In general, the period $T_i$ of a media segment $C_i$ may be greater than its length $l_i$. The methods presented above for clustering and vertical striping can be used to schedule such media segments, however, they may be unnecessarily restrictive.

If $T_i > l_i$, then under clustering and vertical striping, the retrieval of a media segment $C_i$ can be modeled as a collection of periodic real-time tasks with period $T_i = n_i \cdot T$, where each task consists of a collection of $C_i$ subtasks that are T time units apart and have a computation time equal to the column retrieval time. ($C_i$ is the number of columns in $C_i$.) Note that the only difference between this task model and the one defined above is that the distance between consecutive subtasks is only one time slot (rather than $n_{disk}$). The scheduling tree methods and packing-based methods of the present invention for combining forests and trees can easily be modified to deal with this case.

It has been assumed to this point that segments are stored on disks using a matrix-based layout scheme. That is, each column of a segment matrix is stored contiguously. A column is nothing more than the total amount of data that needs to be retrieved in a round for all concurrent display times. Thus, the matrix-based layout provides the advantageous property of reducing the disk latency overhead within a round for all the concurrent phases to a single $t_{lat}$. On the other hand, the scheduling and organizing methods of the present invention can also handle conventional data layout methods that do not exploit the knowledge of retrieval periods during data layout.

In addition to supporting EPPV service, the tree-based scheduling methods of the present invention can offer support for the Random Access service model described above, which places resource reservations to allocate independent physical channels to each individual CMOD client. Under the Random Access service model, the maximum number of streams that can be concurrently retrieved and, therefore, the maximum number of concurrent clients that can be supported is limited by the available resources.

From the above, it is apparent that the present invention provides various systems and methods of scheduling media segments of varying display rate, length and/or retrieval period on at least one clustered, vertically-striped or horizontally-striped CM database volume. With respect to the at least one clustered database volume or the at least one vertically-striped database volume, one method includes the steps of: (1) associating a display value and a normalized bandwidth requirement with each of the media segments, (2) sorting the media segments in a non-increasing order of value density to obtain an ordered list thereof and (3) organizing the media segments into the at least one database volume in an order that increases a total display value of the media segments. With respect to the at least one horizontally-striped database volume, one method includes the steps of: (1) associating a display value with each of the media segments, (2) sorting the media segments in a non-increasing order of value density to obtain an ordered list thereof and (3) building a scheduling tree of the media segments, the scheduling tree having a structure that increases a total display value of the media segments.

Although the present invention has been described in detail, those skilled in the art should understand that they can make various changes, substitutions and alterations herein without departing from the spirit and scope of the invention in its broadest form.

What is claimed is:

1. A system for scheduling media segments of varying display rate, length and retrieval period on at least one continuous media database volume, comprising:

an associator that associates a display value and a normalized bandwidth requirement with each of said media segments;

a sorter that sorts said media segments in a non-increasing order of value density to obtain an ordered list thereof; and an organizer that organizes said media segments into said at least one database volume in an order that increases a total display value of said media segments.

2. The system as recited in claim 1 wherein said associator further associates a normalized storage capacity with each of said media segments.

3. The system as recited in claim 1 wherein said at least one database volume is a set of clustered drives.

4. The system as recited in claim 1 wherein said at least one database volume is a set of drives employing vertical striping.

5. The system as recited in claim 2 wherein said at least one database volume is a set of clustered drives.

6. A method of scheduling media segments of varying display rate, length and retrieval period on at least one continuous media database volume, comprising the steps of:

associating a display value and a normalized bandwidth requirement with each of said media segments;

sorting said media segments in a non-increasing order of value density to obtain an ordered list thereof; and organizing said media segments into said at least one database volume in an order that increases a total display value of said media segments.

7. The method as recited in claim 6 wherein said step of associating comprises the step of further associating a normalized storage capacity with each of said media segments.

8. The method as recited in claim 6 wherein said at least one database volume is a set of clustered drives.

9. The method as recited in claim 6 wherein said at least one database volume is a set of drives employing vertical striping.

10. The method as recited in claim 7 wherein said at least one database volume is a set of clustered drives.

11. A continuous media system, comprising:

a continuous media-on-demand (CMOD) server having at least one database volume associated therewith;

a system for scheduling media segments of varying display rate, length and retrieval period on said at least one database volume, including:

an associator that associates a display value and a normalized bandwidth requirement with each of said media segments, a sorter that sorts said media segments in a non-increasing order of value density to obtain an ordered list thereof, and an organizer that organizes said media segments into said at least one database volume in an order that increases a total display value; and a plurality of media receivers coupled to said CMOD server that receive and perform selected ones of said media segments.

12. The system as recited in claim 11 wherein said associator further associates a normalized storage capacity with each of said media segments.

13. The system as recited in claim 11 wherein said at least one database volume is a set of clustered drives.

14. The system as recited in claim 11 wherein said at least one database volume is a set of drives employing vertical striping.

15. The system as recited in claim 12 wherein said at least one database volume is a set of clustered drives.

16. A system for scheduling media segments of varying display rate, length and retrieval period on at least one horizontally-striped continuous media database volume, comprising:

an associator that associates a display value with each of said media segments;

a sorter that sorts said media segments in a non-increasing order of display value to obtain an ordered list thereof; and an organizer that builds a scheduling tree of said media segments, said scheduling tree having a structure that increases a total display value of said media segments.

17. The system as recited in claim 16 wherein said scheduling tree schedules simple periodic tasks when periodic retrieval of each of said media segments consists of a simple period task.

18. The system as recited in claim 16 wherein said scheduling tree schedules equidistant periodic subtasks when periodic retrieval of each of said media segments consists of equidistant periodic subtasks.

19. The system as recited in claim 18 wherein consecutive edges of a first-level ancestor node in said scheduling tree are disabled.

20. The system as recited in claim 17 wherein said at least one database volume is a set of drives employing horizontal striping.

21. The system as recited in claim 18 wherein said at least one database volume is a set of drives employing horizontal striping.

22. The system as recited in claim 20 wherein said organizer builds a plurality of scheduling trees of said media segments.

23. The system as recited in claim 21 wherein said organizer builds a plurality of scheduling trees of said media segments.

24. A method of scheduling media segments of varying display rate, length and retrieval period on at least one horizontally-striped continuous media database volume, comprising the steps of:

associating a display value with each of said media segments;

sorting said media segments in a non-increasing order of display value to obtain an ordered list thereof; and building a scheduling tree of said media segments, said scheduling tree having a structure that increases a total display value of said media segments.

25. The system as recited in claim 24 wherein said scheduling tree schedules simple periodic tasks when periodic retrieval of each of said media segments consists of a simple period task.

26. The system as recited in claim 24 wherein said scheduling tree schedules equidistant periodic subtasks when periodic retrieval of each of said media segments consists of equidistant periodic subtasks.

27. The method as recited in claim 26 wherein consecutive edges of a first-level ancestor node in said scheduling tree are disabled.

28. The method as recited in claim 25 wherein said at least one database volume is a set of drives employing horizontal striping.

29. The method as recited in claim 26 wherein said at least one database volume is a set of drives employing horizontal striping.

30. The method as recited in claim 28 further comprising the step of building a plurality of scheduling trees of said media segments.

31. The method as recited in claim 29 further comprising the step of building a plurality of scheduling trees of said media segments.

32. A continuous media system, comprising:

a continuous media-on-demand (CMOD) server having at least one horizontally-striped database volume associated therewith;

a system for scheduling media segments of varying display rate, length and retrieval period on said at least one horizontally-striped database volume, including:

an associator that associates a display value with each of said media segments, a sorter that sorts said media segments in a non-increasing order of display value to obtain an ordered list thereof, and an organizer that builds a scheduling tree of said media segments, said scheduling tree having a structure that increases a total display value of said media segments; and a plurality of media receivers coupled to said CMOD server that receive and perform selected ones of said media segments.

33. The system as recited in claim 32 wherein said scheduling tree schedules simple periodic tasks when periodic retrieval of each of said media segments consists of a simple period task.

34. The system as recited in claim 32 wherein said scheduling tree schedules equidistant periodic subtasks when periodic retrieval of each of said media segments consists of equidistant periodic subtasks.

35. The system as recited in claim 34 wherein consecutive edges of a first-level ancestor node in said scheduling tree are disabled.

36. The system as recited in claim 33 wherein said at least one database volume is a set of drives employing horizontal striping.

37. The system as recited in claim 34 wherein said at least one database volume is a set of drives employing horizontal striping.

38. The system as recited in claim 36 wherein said organizer builds a plurality of scheduling trees of said media segments.

39. The system as recited in claim 37 wherein said organizer builds a plurality of scheduling trees of said media segments.

* * * * *